United States Patent [19]
AuWerter

[11] 3,744,511
[45] July 10, 1973

[54] CONDENSATE HANDLING SYSTEM

[75] Inventor: Jay P. AuWerter, Shaker Heights, Ohio

[73] Assignee: The C. E. Squires Company, Cleveland, Ohio

[22] Filed: June 4, 1971

[21] Appl. No.: 150,154

[52] U.S. Cl................................ 137/195, 137/415
[51] Int. Cl................................................ F16t 1/20
[58] Field of Search...................... 251/29; 137/195, 137/415, 194

[56] References Cited
UNITED STATES PATENTS

| | | | |
|---|---|---|---|
| 2,062,672 | 12/1936 | Mastenbrook | 137/195 |
| 2,158,381 | 5/1939 | Raymond | 137/194 X |
| 2,277,170 | 3/1942 | Temple | 137/195 |

*Primary Examiner*—Alan Cohan
*Attorney*—Meyer, Tilberry & Body

[57] ABSTRACT

A system is provided for disposing of condensate accumulating as a result of operation of space heating or cooling processes and apparatus. The system includes a conduit in which condensate accumulates, and a fluid pressure operated discharge valve which is modulated between open and closed conditions to maintain a predetermined level of condensate in the conduit. Modulation of the discharge valve is controlled by a fluid pressure operated pilot valve which is actuated to control flow of operating fluid to the discharge valve. The pilot valve is actuated in response to the level of condensate in the accumulator conduit and the control fluid pressure signal for actuating the pilot valve is flashed condensate under pressure from the accumulator conduit and/or head pressure of condensate in the system. Delivery of condensate and flashed condensate from the accumulator conduit for actuating the pilot valve is controlled by means responsive to the level of condensate in the accumulator conduit, and the magnitude of the pressure signal is controlled by flow restricting means together with the level responsive means.

4 Claims, 4 Drawing Figures

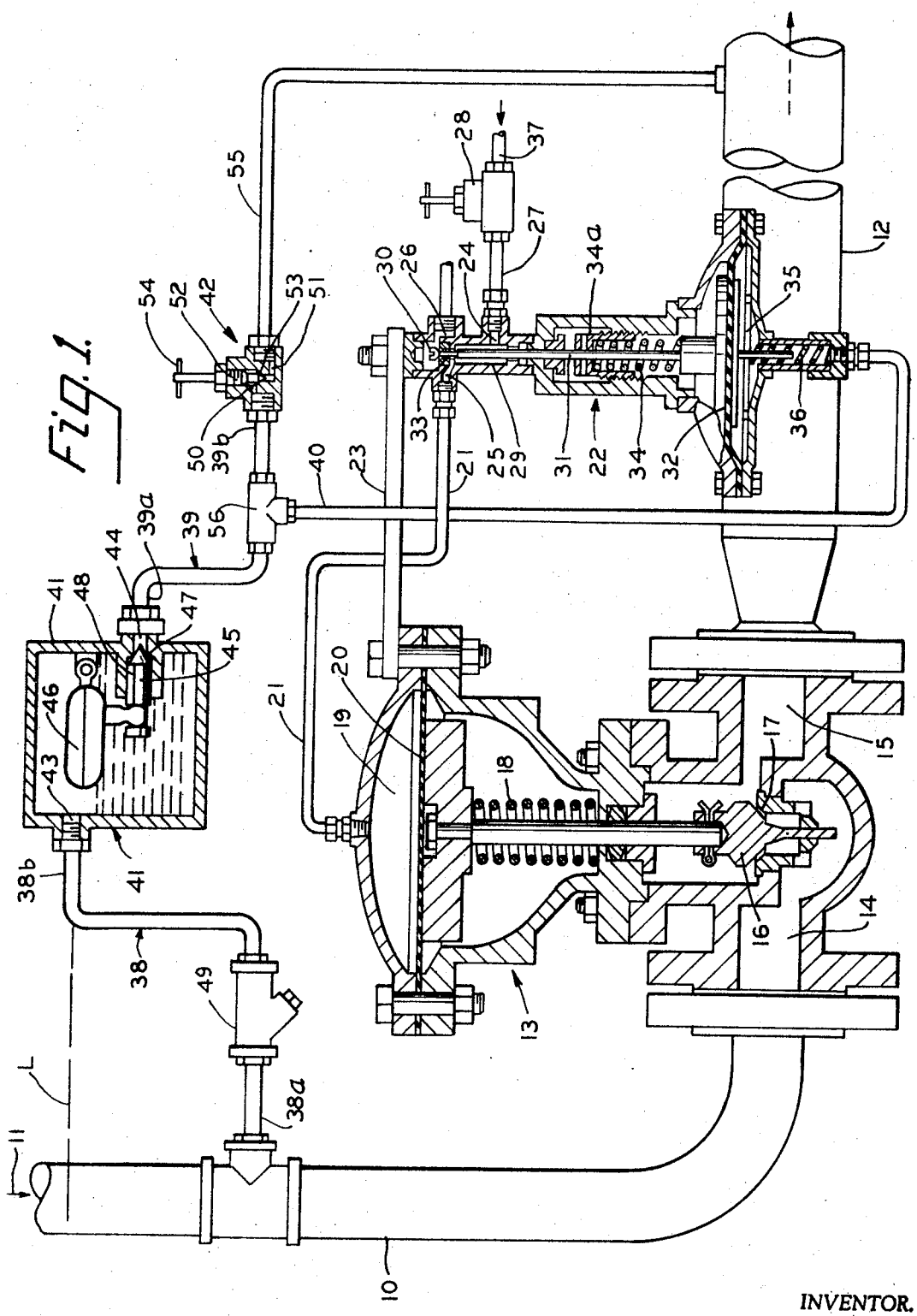

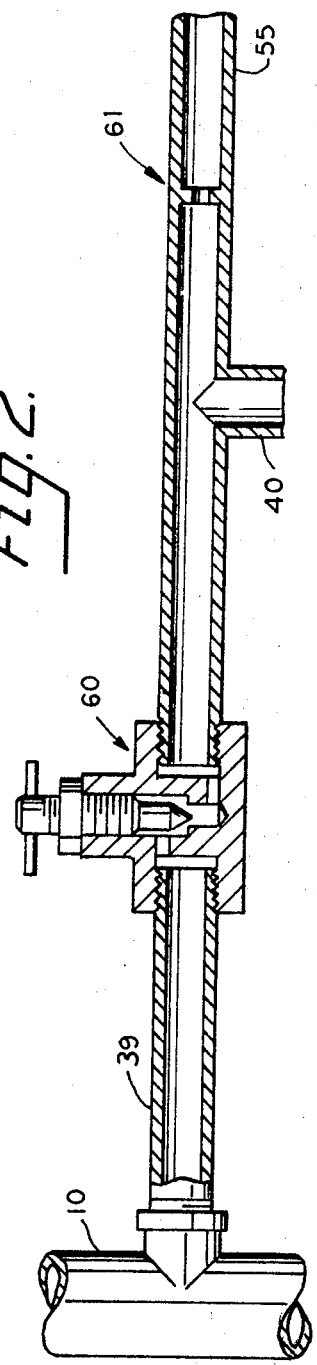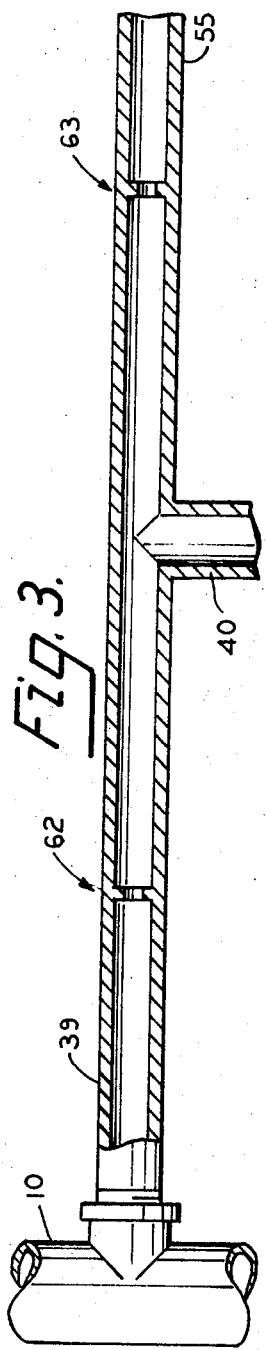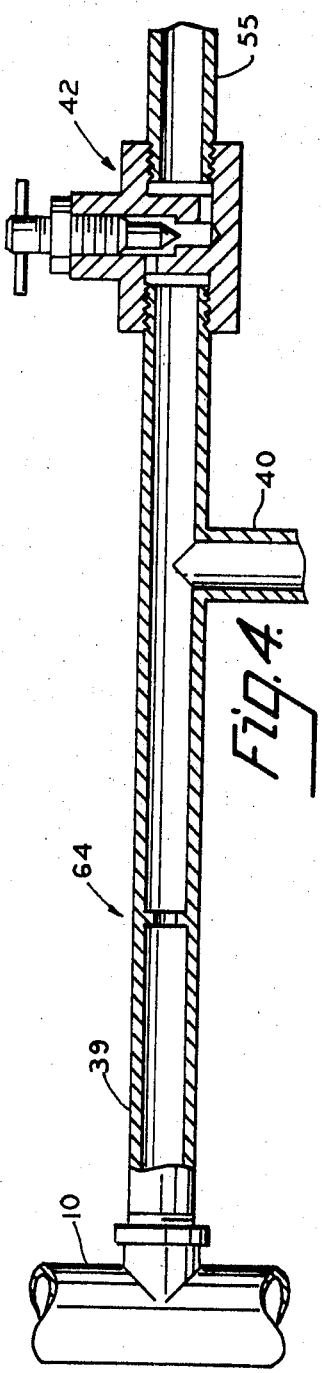

CONDENSATE HANDLING SYSTEM

This invention relates to the art of fluid handling and, more particularly, to the disposal of hot condensate produced in response to operation of any process or system in which condensate is produced such as, for example, a space heating or cooling system.

In the operation of fluid handling systems such as space heating or cooling systems which employ steam or in which steam is generated during operation of the system, condensate develops which must be handled either by discharge to a sewer or the like, or return to the system by suitable pump means. In the past, this has been achieved by employing condensate traps in which condensate accumulates and from which the condensate is released for flow to sewer or drain means or to pump means which return the condensate to the system. Such trap arrangements, however, are limited in the quantity of condensate which they can handle and, accordingly, in a system in which a large amount of condensate is produced, either the trap must be extremely large or a plurality of traps must be employed. Otherwise, condensate undesirably backs up in the system. Thus, where a large quantity of steam or hot water is required in a system supplying, for example, hot water, heat or cooling to a multi-story office building or a complex of buildings such as might be found in an apartment development or a college campus, such buildings are complexes must be provided with separate fluid systems, or either large or a plural number of condensate handling devices such as trap valves. Accordingly, the condensate handling system or systems thus required are quite expensive, involve the use of a large amount of equipment and thus are space consuming. Moreover, it will be appreciated that additional equipment in such systems increases maintenance problems and costs. Still further, systems of this character do not provide for any accuracy in controlling condensate discharge in response to rapidly varying conditions of condensate accumulation.

It would be most desirable, especially in large buildings and building complexes, to have a single condensate handling system comprised of a minimum of components capable of efficiently disposing of any quantity of condensate produced during operation of a given system, whether the amount of condensate produced is at a minimum or maximum for the given system. Further, it would be desirable to provide for such a system to be controlled in accordance with conditions sensed in the system and by system fluid, whereby condensate disposal could be controlled in a manner which is simpler, more accurate and requires less system components than heretofore possible.

The present invention advantageously provides for controlling the discharge of condensate in a system in response to accumulation thereof in the system and in a manner whereby the flow of accumulated condensate from the point of accumulation is controlled by system fluid. Accordingly, the system of the present invention provides for condensate to be maintained at a desired level in a given system and to be discharged with a greater degree of control and with less system valve components than heretofore required. Thus, considerable savings can be realized in system components, less maintenance problems are encountered and a higher efficiency of system operation is achieved.

More particularly, in accordance with the present invention, condensate accumulating in a given system is employed to control a condensate flow control valve in a manner whereby accumulated condensate is maintained at a desired maximum level, and flow through the valve is at a rate depending on accumulation above the desired level. Further, control of the condensate control valve is such that the valve is modulated in accordance with condensate accumulation, whereby condensate disposal is uniform and the operation of system components is substantially continuous when condensate accumulation exceeds the desired level.

The foregoing advantages are achieved in accordance with the present invention by providing for the condensate flow control valve to be controlled by a pilot valve which is in turn controlled by the pressure of flashed condensate in the system alone or together with head pressure of condensate in the system. In this respect, hot condensate is accumulated in the system and upon reaching a desired maximum level a quantity thereof is released to flow into chamber means and across orifice or restriction means. The hot condensate flashes to provide a pressure signal in the chamber means for actuating the pilot valve. The generation of flashed condensate may be continuous or intermittent and varies in quantity between a minimum and maximum. Accordingly, the pilot valve is actuated continuously or intermittently and between closed and open positions. If the accumulated condensate level is such that the chamber means is flooded with condensate, condensate continuously flows therethrough and there is no flashing. Thus, the pressure signal in the chamber means is defined by a head pressure of condensate only. Under conditions wherein partial flooding exists, the control pressure is defined by a combination of head and flashed condensate pressure.

The pilot valve controls flow of operating fluid to the main condensate flow control valve, which operating fluid is thus controlled between no and maximum flow to the main valve, whereby the main valve is modulated between open and closed positions thereof. Operation of the system under the control of the pressure of flashed condensate and/or condensate head pressure provides for the use of a minimum of system components all of which can be compactly organized, and more importantly, provides for controlling the system in a manner whereby condensate disposal is more uniform and efficient than heretofore possible and can be more accurately controlled so as to permit disposal of larger quantities of condensate with less equipment and less maintenance and maintenance costs than heretofore possible.

Accordingly, an outstanding object of the present invention is the provision of a condensate handling system wherein condensate level in the system is controlled by system fluid.

A further object is the provision of a condensate handling system which provides for accurately maintaining the condensate at a desired level.

Another object of the present invention is the provision of a condensate handling system of the above character wherein the flow of accumulated condensate is controlled by valve means actuated in response to a control signal derived from system fluid.

Still another object is to provide a condensate handling system of the above character wherein a condensate head pressure and/or flashed condensate pressure provide a pressure signal by which the flow of accumulated condensate is controlled.

Yet a further object of the present invention is the provision of a condensate handling system of the above character in which a condensate flow control valve is modulated between open and closed positions thereof by pilot valve means which in turn is controlled by the magnitude of the pressure signal.

Still a further object is the provision of a condensate handling system of the above character which requires a minimum of system components, provides for a more accurate and efficient handling of condensate then heretofore possible and is economical to install and maintain.

The foregoing objects and advantages of the present invention will in part be obvious and in part more fully pointed out hereinafter in conjunction with the description of the drawing which illustrates a preferred embodiment of the present invention and in which:

FIG. 1 is an elevation view, partially in section, of a preferred embodiment of a condensate handling system within the present invention; and FIGS. 2–4 are detail views of modifications of the pilot valve control portion of the system illustrated in FIG. 1, still within the present invention.

Referring now to the drawing wherein the showings are for the purpose of illustrating preferred embodiments of the invention only and not for the purpose of limiting the same, there is illustrated in FIG. 1 a condensate disposal system including condensate accumulator means in the form of a conduit 10 into which hot condensate flows in the direction of arrow 11 from a heating or cooling system, not shown. Condensate accumulating in conduit 10 is adapted to be discharged to a conduit 12 under the control of a fluid pressure operated discharge valve 13 having inlet passageway means 14 connected to accumulator conduit 10 and outlet passageway means 15 connected to discharge conduit 12. Valve 13 includes a flow controlling element 16 which is movable between open and closed positions relative to a seat 17 in the valve housing. In the embodiment illustrated, valve element 16 is biased toward the open position by spring means 18 and is adapted to be actuated toward the closed position thereof against the spring bias by fluid pressure introduced into chamber 19 defined by a diaphragm component 20. Operating fluid for actuating the valve element is delivered to chamber 19 through flow line means 21.

The flow of operating fluid to chamber 19 is controlled by pilot valve means 22 which may, if desired, be supported relative to valve 13 such as by a support bar 23. Pilot valve means 22 includes housing means provided with an inlet port 24, an outlet port 25 and a bypass port 26. Inlet port 24 is connected through line 27 and needle valve means 28 to a suitable source of operating fluid, not illustrated, for discharge valve 13. Outlet port 25 is connected to line 21 leading to diaphragm chamber 19 of valve 13. The pilot valve housing further includes a passageway 29 between inlet 24 and outlet 25, whereby operating fluid for discharge valve 13 is adapted to flow from the source thereof to diaphragm chamber 19. The pilot valve further includes a reciprocable flow control element 30 interconnected by means of a stem 31 with diaphragm component 32 of the pilot valve. Flow control element 30 is adapted to be actuated to open and close a passageway 33 extending between passageway 29 and bypass passageway 26. Flow control element 30 is normally biased to close passageway 33 by means of a coil spring 34 and is adapted to be moved to open passageway means 33 in response to pressure of operating fluid delivered to chamber 35 behind diaphragm 32. The biasing force of spring 34 is adapted to be overcome by fluid pressure in chamber 35 together with the biasing force of a second spring 36 which exerts a biasing force against diaphragm 32 in opposition to the biasing force of spring 34. The biasing force of spring 34 is adjustable by means of an adjusting nut 34a associated therewith and is slightly greater than the biasing force of spring 36. Adjustment of the relative biasing forces of the two springs permits selection of a desired fluid pressure in chamber 35 to cause actuation of flow control element 30. Spring 36 is employed when the control pressure in chamber 35 is in the vicinity of 2 to 3 psi. When the pressure in chamber 35 is above this level, spring 36 can be eliminated and spring 34 alone employed.

In operation of the system as thus far described, when flow control element 30 of pilot valve 22 is closed, operating fluid for valve 13 flows from the source thereof through valve 28 and inlet port 24 of pilot valve 22, through passageway 29 and outlet 25 to flow line 21 and thence into diaphragm chamber 19. When flow control element 30 is actuated to open passageway 33, control fluid for valve 13 can flow through passageway 33 to bypass passageway 26 and through a line 37 leading back to the control fluid source, to a suitable drain, or to atmosphere if the control fluid is air. Opening of passageway 33 causes a pressure drop in diaphragm chamber 19, whereby spring 18 moves flow control element 16 of valve 13 away from seat 17 to open the discharge valve. It will be appreciated, that the extent to which valve 13 opens is dependent on the degree of pressure drop in diaphragm chamber 19 and that the extent of the pressure drop in chamber 19 is dependent on the extent to which flow control element 30 moves to open passageway 33. If flow control element 30 moves to fully open passageway 33 for flow therethrough of control fluid, the pressure drop in diaphragm chamber 19 will be sufficient for spring 18 to move valve element 16 to the full open position thereof. Thus, flow control element 30 of pilot valve 22 controls flow of fluid to diaphragm chamber 19 in a manner whereby discharge valve 13 is modulated between the open and closed positions thereof.

Operating fluid for pilot valve 22 in the embodiment illustrated includes a condensate head and flashed condensate under pressure. More particularly, diaphragm chamber 35 is connected to accumulator conduit 10 through means including flow lines 38, 39 and 40 and flow control means including, in this embodiment, float actuated valve means 41 and valve means 42. Valve means 41 and 42 define variable flow restriction devices for the purpose set forth more fully hereinafter, and the space therebetween defines chamber means. Valve means 41 includes inlet passageway means 43, outlet passageway means 44, needle valve element 45 and a float element 46 for controlling the position of needle valve 45 relative to a valve seat 47 provided in a valve passageway 48 for the needle valve. In a manner well known in the art, needle valve element 45 has one or more flat surfaces along the length thereof which permit fluid flow along the length thereof when the needle valve is displaced from its seat It will be appreciated that any suitable float actuated valve mechanism, such as a float trap, for example, and flow control devices such as mechanical, thermostatic or thermodynamic traps may be employed in place of valve 41 and that valve 41 is simply illustrative of the general structure and operation of such a device. Flow line 38 has one end 38a thereof connected to accumulator conduit 10 and the other end 38b thereof is suitably connected to valve 41 for flow communication with inlet passageway means 43 thereof. A strainer device 49 may be, if desired, interposed in line 38. It will be appreciated that flow line 38 can extend longitudinally from conduit 10 to valve 41 as opposed to having the valve vertically offset as in the drawing. Similarly, line 39 can extend horizontally from valve 41.

Flow line 39 has one end 39a thereof suitably connected to the housing of valve 41 for flow communication with outlet passageway means 44 of the valve. The other end 39b of flow line 39 is suitably interconnected with valve means 42. Valve means 42 is in the form of a needle valve having inlet and outlet passageway means 50 and 51, respectively, and a needle valve element 52 adjustable relative to a seat 53 therefor so that the size of the opening through the valve may be varied. In the embodiment illustrated, valve element 42 is adjustable by means of a rotatable operating handle 54, but it is to be clearly understood that other adjustable flow restricting means may be employed. The outlet side of the flow restricting device 42 is connected to a flow line 55 which may lead to a drain or, as illustrated in the preferred embodiment, to a point in discharge conduit 12 downstream from discharge valve 13. Flow line 40 is connected to flow line 39 intermediate the opposite ends thereof such as be a T-fitting 56 and leads from flow line 39 to diaphragm chamber 35 of pilot valve 22.

It will be appreciated that in use, line 40 leading from line 39 to pilot valve diaphragm chamber 35 will be filled with condensate at atmospheric pressure or the pressure in discharge line 12. Thus, there is a slight constant pressure applied to the diaphragm by this liquid depending on the liquid head. This pressure is balanced by adjusting nut 34a to increase the bias of spring 34 on the diaphragm. Accordingly, the pressure which exists in line 39 upon opening of valve 41 acts against the fluid in line 40 which thus operates as a follower to actuate pilot diaphragm 32. It will be appreciated, however, that pilot valve 22 could be positioned with the inlet to diaphragm chamber 35 as disposed above and adjacent line 39, whereby such a liquid follower would not be employed.

Release of condensate from accumulator means 10 to develop a pressure signal to cause actuation of the pilot valve, is controlled by valve 41, and the generation of a control pressure signal is accordingly responsive to the level of condensate accumulating in conduit 10. Assuming the area between valves 41 and 42 to be empty, when condensate accumulating in conduit 10 reaches a level indicated by broken line L represent a predetermined desired level of condensate to be maintained in conduit 10, condensate will begin to flow into valve 41 which is positioned in the embodimdnt illustrated as having inlet passageway means 43 in alignment with line L. Level L can, of course, be maintained above the valve inlet line, as set forth more fully hereinafter. If the condensate in conduit 10 and valve 41 exceeds the desired level, float 46 will actuate needle valve element 45 to open outlet passageway 44, whereby the hot condensate from valve 41 flashes into line 39. The condensate in valve 41 is, of course, under system pressure and, accordingly, condensate entering flow line 39 from valve 41 is under the same pressure. The rate of flow from valve 41 to line 39 is, of course, dependent on the size of the outlet orifice defined by the position of needle valve 45 relative to valve seat 47. This condensate flashes and flows under pressure to the inlet side of flow restriction means 42 and flows therethrough at a rate dependent on the size of the orifice theretrhough which is defined by the position of valve element 52 relative to valve seat 53. The restriction to flow of the flashed condensate through valve 42 causes a pressure build up in the area of flow line 39 between valves 41 and 42. This pressure is transmitted or applied to pilot valve diaphragm 32 through the condensate in flow line 40 and diaphragm chamber 35. Thus, the flashed condensate pressure is applied to diaphragm 32 causing displacement of the diaphragm and actuation of pilot valve flow control element 30 toward the open position thereof. Movement of pilot valve element 30 toward the open position thereof permits the flow of discharge valve control fluid to bypass passageway 26 in the pilot valve, whereby pressure is reduced in diaphragm chamber 19 of discharge valve 13 so that biasing spring 18 operates to displace flow control element 16 from its seat 17. The latter movement, of course, opens discharge valve 13 whereby condensate in accumulator conduit 10 flows through valve 13 to discharge conduit 12. When the level of condensate in conduit 10 recedes to level L, float valve 41 operates to close communication between flow lines 38 and 39. Thereafter, the condensate remaining in flow line 39 flows through flow restriction 42 resulting in a decrease in pressure between valves 41 and 42 and, therefore, a decrease in pressure in diaphragm chamber 35 of pilot valve 22. In response to the decrease in pressure in diaphragm chamber 35, spring 34 operates to move pilot valve flow control element 30 to the closed position whereby control fluid for discharge valve 13 again flows to diaphragm chamber 19 to increase the pressure in the diaphargm chamber and accordingly, close discharge valve element 16 against seat 17 to close discharge valve 13 against further flow of condensate from conduit 10.

The level of condensate in accumulator conduit 10 will not always exceed level L to the extent or for a duration of time sufficient to maintain float control valve 41 in the full open position or open to the extent that a sufficient quantity of flashed condenstate enters the expansion chamber area between valves 41 and 42 to generate a control pressure signal of a magnitude to cause actuation of the pilot valve. Thus, accumulation of condensate in conduit 10 which only slightly exceeds level L will cause float valve 41 to be partially opened so that there is only a very small quantity of flashed condensate flow from the float valve into flow line 39. Such a flow of flashed condensate into line 39 will not result in actuation of pilot valve 22. If, on the other hand, the accumulation of condensate in conduit 10 slightly exceeds level L, float controlled valve will open to a slightly greater extent and a sufficient quantity of flashed condensate under pressure will enter the expansion chamber area to provide a pressure signal sufficient to actuate pilot valve 22. Thus, it will be appreciated that for varying levels of condensate accumulating in conduit 10 in excess of level L float operated valve 41 will be actuated to cause pressure variations in flow line 39 which, in combination with flow restricting means 42, will cause pilot valve 22 to be actuated variably and for varying periods of time.

Considering now the situation in which accumulated condensate in accumulator means 10 exceeds level L substantially or for a substantial period of time or the level L to be maintained is above the inlet to valve 41, the chamber area between valves 41 and 42 will be flooded or partially flooded with condensate. If completely flooded, valve 41 is maintained open and there is a continuous flow of condensate therethrough and through valve 42. Thus, a condensate head pressure develops in the chamber the magnitude of which is dependent on the size of the chamber and the ratio of the sizes of the orifices defined by valves 41 and 42. Thus, under a flooded condition, the control signal is condensate head pressure alone.

Under conditions wherein the chamber area between valves 41 and 42 is partially flooded, it will be appreciated that flashed condensate will be released into the chamber area, whereby the control signal developed is a combination of condensate head pressure and flashed condensate pressure. Thus, it will be appreciated that a versatile control system is provided in accordance with the present invention which provides for disposal of accumulated condensate under variable and varying system conditions and which at the same time provides for such control be achieved employing relatively small pilot valve means.

As mentioned hereinabove, the control of the pilot valve and accordingly the control of the main valve is dependent on the presence or absence of pressure in line 39 between valve means 41 and 42. Moreover, it will be appreciated that the pressure level between the valves at any given time when valve 41 is open and for a given size chamber area is dependent on the relative sizes of the orifice defined by opening valve 41 and the orifice provided in adjustable valve 42. The size of the orifice through valve 42 can be varied and the size of the orifice defined by opening valve 41 will vary depending on the level of accumulated condensate. For development of a control signal pressure in the expansion chamber area between the valves it is only necessary that the orifices have a size ratio which will assure that flashed condensate is trapped therebetween. By providing for the orifice in valve means 42 to be adjustable, a more accurate adjustment of the control pressure for a given system is made possible.

The maximum level of the flashed condensate control pressure in the chamber area for actuating the pilot valve preferably is maintained at about 2 to 3 psi. This provides a low pressure control signal which permits the use of a small pilot valve. The level of the signal can be above this level, and spring 34 provides for adjusting the pilot valve response level accordingly. The control signal pressure can not, of course, exceed the system pressure in conduit 10 together with any liquid head resulting from level L being above valve 41, but the control signal advantageously can be less than the pressure. For example, system pressure may be 600 psi or higher and a flashed condensate control pressure of 2 to 3 psi can be established in the chamber area between valves 41 and 42 by designing for the chamber volume and relative orifice sizes in the valves to trap flashed condensate only to the extent that a 2 to 3 psi pressure can develop in the chamber area.

With regard to the variable orifice means defined by float controlled valve 41, it will be appreciated that other variable orifice devices could be employed in place thereof. Moreover, it will be appreciated that control pressures can be developed employing fixed as opposed to variable restrictions or a combination of fixed and variable restrictions to flow in line 39. With regard to the foregoing, FIGS. 2, 3 and 4 illustrate arrangements for developing and controlling the magnitude of control pressure for the pilot valve. In these figures, components corresponding to the system illustrated in FIG. 1 are indicated by the same numerals employed in FIG. 1. In FIG. 2, for example, flow line 39 is connected directly to conduit 10 and is provided with adjustable orifice means 60 in the form of a needle valve and fixed orifice means 61, which orifice means correspond, respectively, to valves 41 and 42 in FIG. 1. Line 40 leads to the pilot valve diaphragm chamber and opens in line 39 between the restriction devices. In FIG. 3, the restriction devices are defined by fixed orifice or restriction means 62 and 63 corresponding, respectively, to valves 41 and 42. In FIG. 4 fixed restriction means 64 replaces valve means 41 and is employed in conjunction with variable orifice valve 42.

It will be appreciated that with any of the arrangements of FIGS. 2, 3, 4, when the level of hot condensate in conduit 10 covers the orifice defining restriction means 60, 62 or 64, the condensate flashes upon flowing through the orifice and a pressure is generated between the spaced orifice in line 39 depending, as mentioned hereinbefore, on the sizes of the two orifices in the line. The pressure developed is thus controllable by either adjustably varying the orifice size or designing a fixed orifice size in accordance with a desired pressure sought for a given system. More flexibility is achieved, of course, if at least one of the orifices is adjustable.

It will be further appreciated, as mentioned hereinabove, that the control arrangement of the present invention advantageously is equally well suited for use in high or low pressure hot condensate systems. Thus, the size of flow line 39 and the orifice devices therein can be designed to provide for a low pilot control pressure to be established between the orifice devices, regardless of the system pressure. Thus, even in a high pressure sytem, a low pressure control signal can be gdnerated, whereby control of condensate from the accumulating conduit can be achieved with a relatively small pilot valve which is very accurately controlled.

While considerable emphasis has been placed herein on the particular structures and operations of the discharge valve and pilot valve it will be clearly understood that these valves may take forms other than the form illustrated and described herein. In this respect, the discharge valve might well be spring biased to a closed position and pressure operated to an open position. If the discharge valve were so operated, the pilot valve would be acuated to deliver operating fluid to the discharge valve to cause opening thereof as opposed to being operated to vent valve operating fluid to cause opening of the discharge valve as in the embodiment herein described.

As many possible embodiments of the present invention may be made and as many possible changes may be made in the embodiment herein set forth, it is to be clearly understood that the foregoing description is merely illustrative of the present invention and is not interpreted to be a limitation.

I claim:

1. A condensate disposal system comprising an accumulator for condensate under pressure, a diaphragm actuated fluid pressure operated discharge valve connected to said accumulator and operable when open to discharge condensate from said accumulator, said discharge valve including housing means cooperable with said diaphragm to define an actuating fluid chamber for receiving actuating fluid to displace the diaphragm in the direction to close said discharge valve and spring means biasing said diaphragm in the direction to open said discharge valve, a source of discharge valve actuating fluid separate from the fluid of said system, a system fluid pressure operable pilot valve for controlling the flow of said actuating fluid to said actuating fluid chamber, control means connecting said accumulator to said pilot valve, said control means including accumulator level responsive flow control means connected to said accumulator, flow restriction means and a pressure signal chamber therebetween, said flow control means being operable in response to condensate level in said accumulator above a desired level to deliver condensate and/or flashed condensate under pressure into said pressure signal chamber and said restriction means restricting flow of said condensate and/or flashed condensate from said pressure signal chamber, whereby a pressure signal is developed in said pressure signal chamber, and a flow line from said pressure signal chamber to said pilot valve to transmit said pressure signal to said pilot valve, said pilot valve being operable in response to said pressure signal to control the flow of said separate actuating fluid to said actuating fluid chamber to decrease the pressure of actuating fluid in said actuating fluid chamber for the bias of said spring means to displace the diaphragm in the direction to open said discharge valve.

2. The condensate disposal system of claim 1, wherein said flow control means comprises level responsive valve means having an inlet end connected to said accumulator and an outlet end communicating with said pressure signal chamber.

3. The condensate disposal system of claim 2, wherein said flow restriction means is adjustable orifice means.

4. The condensate disposal sysem of claim 3, wherein said level responsive valve means is float actuated.

* * * * *